United States Patent [19]
Isaacs

[11] Patent Number: 5,553,460
[45] Date of Patent: Sep. 10, 1996

[54] HORIZONTAL OIL SEPARATOR/RESERVOIR

[75] Inventor: Paul E. Isaacs, Auburn, Ill.

[73] Assignee: AC & R Components, Inc., Chatham, Ill.

[21] Appl. No.: 490,389

[22] Filed: Jun. 14, 1995

[51] Int. Cl.$^6$ .......................... B01D 19/00; F25B 43/02
[52] U.S. Cl. .................... 62/129; 62/470; 96/212
[58] Field of Search .................. 62/84, 470, 473, 62/129; 96/209, 212

[56] References Cited

U.S. PATENT DOCUMENTS

| | | | |
|---|---|---|---|
| 2,610,697 | 9/1952 | Lovelady et al. | 96/212 X |
| 3,070,977 | 1/1963 | Kimmel et al. | 62/473 |
| 3,778,984 | 12/1973 | Lawser | 55/337 |
| 4,263,029 | 4/1981 | George | 55/398 |
| 4,428,208 | 1/1984 | Krause | 62/192 |
| 4,478,050 | 10/1984 | DiCarlo et al. | 62/193 |
| 4,662,190 | 5/1987 | Tischer | 62/170 |
| 5,113,671 | 5/1992 | Westermeyer | 62/468 |

*Primary Examiner*—William E. Wayner
*Attorney, Agent, or Firm*—Hill, Steadman & Simpson, A Professional Corp.

[57] ABSTRACT

An oil separator for separating liquid oil from a gaseous refrigerant in a refrigerant system has an oil separator chamber and an oil reservoir chamber arranged horizontally adjacent to one another. The oil separator chamber contains an oil separator having an inlet for receiving a refrigerant/oil mixture, a separator for separating the gas and oil from the oil/gas mixture, a gas outlet and an oil outlet leading from the very bottom of the oil separator chamber into the oil reservoir chamber. The oil reservoir chamber contains an oil return inlet opening near a bottom of the oil reservoir chamber leading to an outside of the oil reservoir chamber. Also, an arrangement is provided at the oil outlet for allowing a flow of oil from the oil separator chamber to the oil reservoir chamber, but preventing a flow of oil from the oil reservoir chamber to the oil separator chamber.

20 Claims, 2 Drawing Sheets

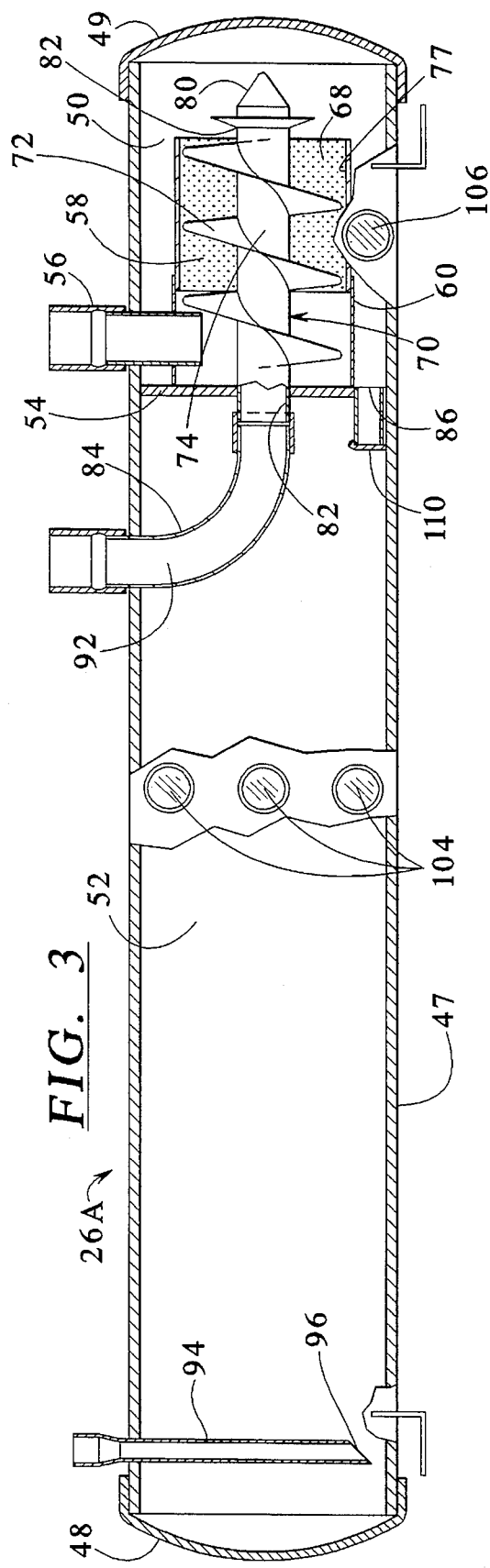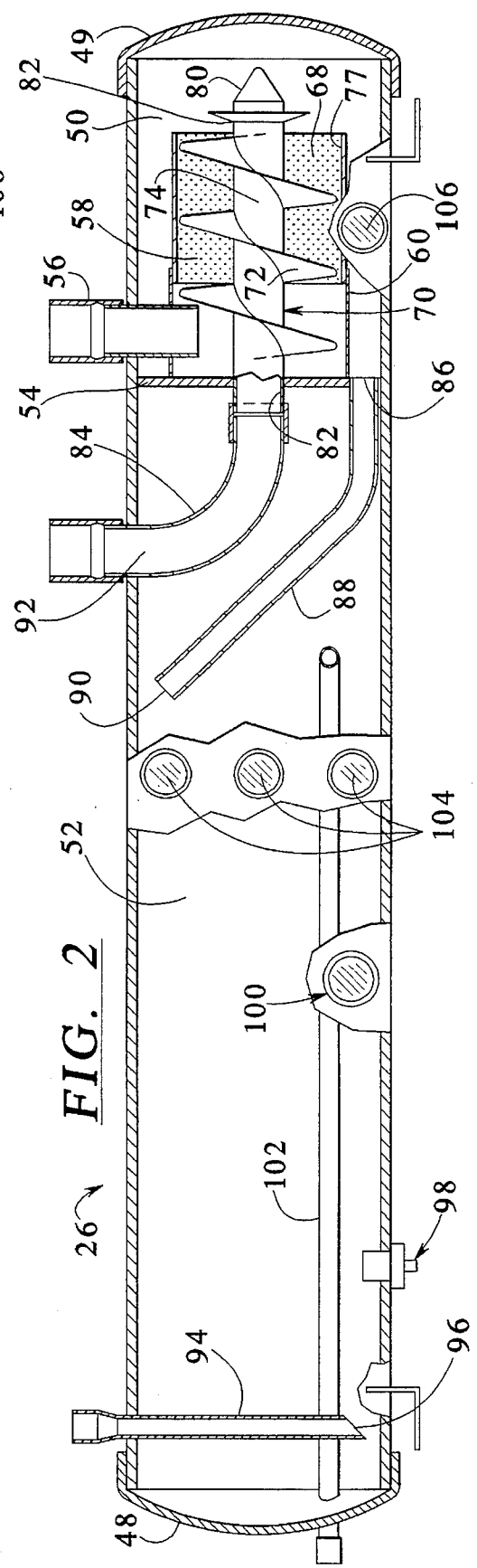

5,553,460

HORIZONTAL OIL SEPARATOR/RESERVOIR

BACKGROUND OF THE INVENTION

The present invention relates to oil separators and more particularly to a horizontally arranged oil separator for use in a refrigeration system to separate oil from an oil/refrigerant gas mixture.

Refrigeration systems utilize a compressor to compress a refrigerant gas, a condenser to cool the compressed gas and to cause the gas to condense to a liquid and an evaporator for absorbing heat from the area to be refrigerated as the liquid refrigerant expands and evaporates. In many such systems, oil is used as a lubricant and to provide a more effective seal in the compressor and, by such use, is mixed with the refrigerant gas in the compressor and is carried along with the refrigerant. Oil, however, is not a refrigerant and therefore it reduces the efficiency of the system if the oil is permitted to remain mixed with the refrigerant gas as it moves to the condenser. Therefore, it is known to provide an oil separator in the line between the compressor and condenser to remove the oil from the refrigerant gas. Generally, refrigerant gas from the compressor contains oil in the form of a fog as it enters the oil separator inlet.

Various arrangements have been provided for separating the oil from the gas. For example, U.S. Pat. No. 3,778,984 discloses an arrangement for introducing the oil and gas mixture tangentially to a separator so as to centrifuge the oil from the gas so that the oil will fall downwardly under the force of gravity into a collecting chamber in the bottom of the separator. U.S. Pat. No. 4,478,050 discloses an oil separator in which fluid is introduced tangentially in a chamber bounded by a screen upon which the oil particles collect. The oil and refrigerant mixture is caused to flow in a vortex providing centrifugal separation of oil particles. Deflector tabs are provided to enhance or regenerate the vortex in the lower portion of the chamber above the oil outlet opening. U.S. Pat. No. 4,263,029 discloses an oil separator in which fluid is introduced tangentially in a passageway formed by a spiral wall having a single revolution. The fluid then passes to a chamber bounded by an annular ring and then to a chamber bounded by a funnel shaped wall with a central opening for passage therethrough of collected oil and including vanes for guiding the oil to the opening. The "oil free" gas leaves the separator through a central, axial passage.

U.S. Pat. No. 5,113,671, assigned to the assignee of the present application, discloses an oil separator for use in a refrigerant system wherein a centrifugal separator is used which is arranged around a vertical axis and which uses a separate oil reservoir.

SUMMARY OF THE INVENTION

The present invention provides an improved oil separator which is horizontally disposed to provide an enhanced oil separation capability and an oil reservoir associated with the separator in one compact assembly. In a preferred arrangement, the oil/refrigerant mixture is caused to flow in a generally spiral flow path around a horizontal axis and along a perforated peripheral wall of an oil separator unit so as to increase the effective path length of the oil/refrigerant mixture along the peripheral wall, By spinning the oil/refrigerant mixture around the horizontal axis, the oil is forced to the outside where it hits the peripheral wall and drains through the perforations and collects in an oil separator chamber.

A preferred method for providing the enhanced effective length of the peripheral wall of the oil separator is to put a stationary helical wall or auger extending around an axis in the space internal of the peripheral wall of the oil separator chamber. Also, a central passage or conduit extending along the axis, radially inward of the helical wall, can be provided for leading the refrigerant gas from the separator. The oil/refrigerant mixture is introduced to the oil separator and is caused to impinge upon the flights of the helical wall and to follow the helical path as the mixture moves horizontally.

The separated oil drips from the perforated peripheral wall to the bottom of the oil separator chamber housing the helical separator. An oil transfer device in the form of a tube disposed at an angle extends from a baffle plate forming one side wall of the oil separator chamber into an oil reservoir chamber. The tube terminates near a top of the oil reservoir chamber.

The refrigerant gas, which is largely free of oil, passes through a screened opening to a central passage or conduit to proceed to an outlet tube leading to the condenser. The outlet tube passes through the oil reservoir chamber and a vent hole is provided in the outlet tube to permit gases which are carried into the oil reservoir chamber to flow into the outlet tube to the condenser.

An oil return tube extends to near the bottom of the oil reservoir chamber to allow oil to be drawn from the oil reservoir chamber.

A number of other devices may also be included in the oil reservoir chamber, such as an oil cooler coil, sight glasses to determine the level of oil, a low level device which could sound an alarm or terminate operation of equipment in the event the oil level drops to a certain level, and an oil drain to permit the complete draining of the oil reservoir chamber.

BRIEF DESCRIPTION OF THE DRAWINGS

FIG. 2 is a side sectional view of an oil separator embodying the principles of the present invention.

FIG. 3 is a sectional view taken generally along the line III—III of FIG. 2.

DESCRIPTION OF THE PREFERRED EMBODIMENTS

Figure 1:
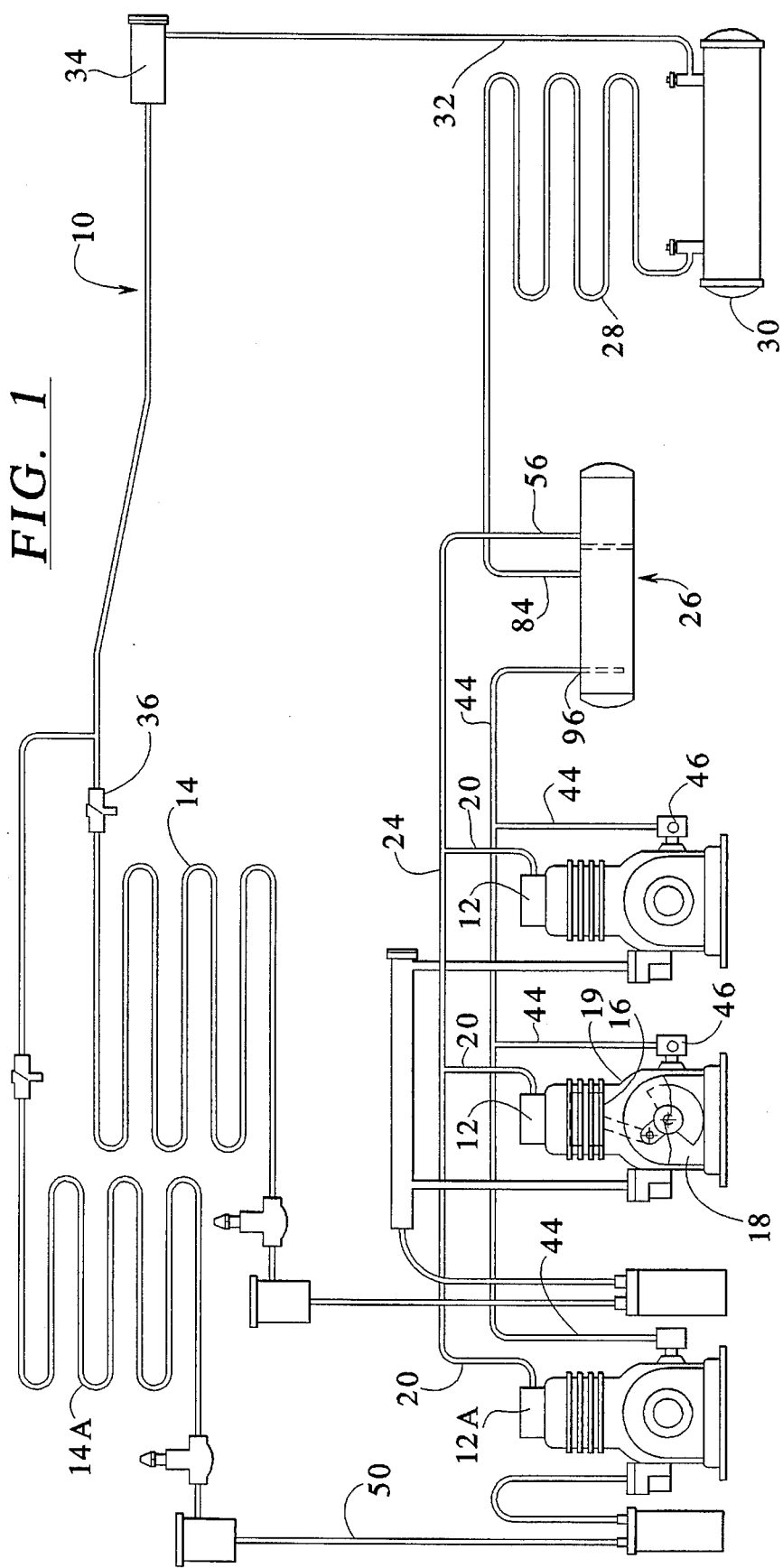
FIG. 1 illustrates a refrigeration system incorporating an oil separator embodying the principles of the present invention.

In FIG. 1 there is illustrated a standard refrigeration system 10. In such a system one or more compressors 12 are used to compress a refrigerant gas after that gas has expanded in an evaporator 14. The compressors 12 utilize a reciprocating piston 16. Oil 18 is provided in an abundant supply within a crankcase 19 of the compressor 12 both to provide lubrication to the piston 16 as well as to enhance the sealing of the piston within the compressor so as to increase the efficiency of the compressor. During operation of the compressor, the oil becomes atomized and mixed with the refrigerant as the mixture leaves through an exit conduit 20. The mixture passes into a manifold 24 which communicates with additional compressors 12 if there are multiple compressors arranged in a parallel arrangement.

Since the oil is not a refrigerant and the presence of oil in the refrigerant decreases the efficiency of the remainder of the refrigeration system, an oil separator 26 is provided in the line between the compressor 12 and a condenser 28 so as to remove the oil from the gas mixture. An improved oil separator embodying the principles of the present invention is described in greater detail below.

As the gas moves into the condenser 28 it is cooled and is caused to condense into a liquid which is captured in a receiver 30. The cooled refrigerant liquid then flows through a conduit 32, through a filter-dryer 34, and through an expansion valve 36 to the evaporator 14. In the evaporator the liquid refrigerant is caused to evaporate thereby absorbing heat energy and thus cooling an area associated with the evaporator. The refrigerant gas then flows through conduit 38 to return to the compressors 12. More than one evaporator 14, 14A may be provided, and if so, one or more satellite compressors 12A are provided to receive and compress the refrigerant gas from the extra evaporators 14A to feed the compressed gas/oil mixture to the manifold 24 for passage through the oil separator 26.

The oil which has been separated in the oil separator 26 is directed through conduits 44 to the compressors 12. Oil level regulators 46 associated with each compressor allow for the introduction of the proper amount of oil to the compressors.

The oil level regulators 46 control the oil level in each crankcase 19 by means of a float operated valve. The oil level regulator 46 holds back excess oil until the oil level in the compressor crankcase 19 drops, lowering the float and opening the valve. Oil from the oil separators 26 will then be admitted into the crankcase raising the float. When the correct level is reached, the valve will close, stopping the flow of oil to that particular crankcase. The oil level regulators may also be adjustable to provide slightly varying oil levels within the crankcase as disclosed in U.S. Pat. No. 4,428,208, assigned to the assignee of the present invention and incorporated herein by reference.

The improved oil separator 26 embodying the principles of the present invention is shown in greater details in FIGS. 2 and 3. The oil separator 26 has a generally cylindrical horizontal axis outer housing or peripheral wall 47 which is closed by a first end cap 48 and a second end cap 49. An interior of the oil separator 26 is comprised of an oil separator chamber 50 and an oil reservoir chamber 52 arranged in a horizontal side-by-side manner and separated by a vertical baffle plate 54. An inlet 56 extends through the peripheral wall 47 into the oil separator chamber 50. The oil enters the oil separator inlet 56 in the form of a fog carried along with the refrigerant gas.

Within the oil separator chamber there is an oil separator unit 58 which, in the preferred embodiment illustrated, is a centrifugal separator arranged along a horizontal axis. The oil separator unit has a perforated peripheral cylindrical wall 60 through which the inlet 56 extends either radially or tangentially relative to the cylindrical wall 60.

Interior of the cylindrical wall 60 is a static auger 70 which has a helical thread wall or flights 72 formed thereon and extending outwardly from a horizontal central hollow cylindrical conduit 74 toward the cylindrical wall 60. The wall 72 of the auger 70 is sized to be closely adjacent to or in contact with the cylindrical wall 60 such that a helical flow path results between the inlet 56 and an open end 77 of the cylindrical wall 60. The helical wall 72 preferably makes at least two full revolutions. Thus, the oil/refrigerant mixture will be forced to follow a largely circumferential flow path along the cylindrical wall 60 providing a substantially longer effective length of the steel mesh screen seen by the oil/ refrigerant mixture than if the oil/refrigerant mixture were allowed to flow axially along the cylindrical wall 60. Of course, a largely circumferential flow path, other than a helical flow path can be provided by appropriately arranged walls between said cylindrical wall 60 and said conduit 70.

Both the cylindrical wall and the auger 70 terminate a substantial distance away from the second end cap 49. A mesh filter 80 is provided at an open end 82 of the conduit 74, in the space between the end of the auger 70 and the end cap 49. The refrigerant, which is now relatively free of oil, exits the oil separator chamber 50 through the filter 80 and interior of the conduit 74 and leaves the oil separator chamber 50 at an outlet 82 which leads to a tube 84 passing through the oil reservoir chamber 52 in the baffle plate 54 and extending to the exterior of the outer housing 47 to connect to the condenser 28.

The oil which has separated from the refrigerant collects in the bottom of the oil separator chamber 50. An oil outlet 86 is provided in the oil separator chamber 50 through the baffle plate 54. In the embodiment of FIG. 2, the oil outlet 86 leads to an oil transfer tube 88 which extends into the interior of the oil reservoir chamber 52. The tube 88 enters the oil reservoir chamber 52 adjacent to a bottom thereof, but extends upwardly within the oil reservoir chamber to an open end 90 at a high elevation or near the top of the oil reservoir chamber. In operation, a pressure differential exist between the oil separator chamber 50 and the oil reservoir chamber 52 such that oil from the bottom of the oil separator chamber will be forced through the oil outlet 86 and up through the oil transfer tube 88 to be dispensed into the oil reservoir chamber 52. This will result in a high oil level in the oil reservoir chamber 52 and a low oil level in the oil separator chamber 50 and the continuous flow of oil between the chamber. Also, this arrangement will prevent a back flow of oil from the oil reservoir chamber 52 into the oil separator chamber 50 even when the compressor shuts off and pressures equalize between the two chambers.

Although most of the refrigerant gas is separated from the oil by the oil separator, some gas is entrained in the oil when the oil is transferred between the chambers and this gas separates from the oil within the oil reservoir chamber. A vent opening 92 is provided in the refrigerant outlet tube 84 where it passes through the oil reservoir chamber, at an elevation above the open end of the oil transfer tube 88. The oil which collects in the oil reservoir chamber 52 is stored therein until needed by the compressor 12. Oil is returned to the compressor 12 through an oil return conduit 94 having an inlet 96 positioned near a bottom of the oil reservoir chamber 52.

Various optional elements can be added to the oil separator 26 such as an oil drain 98 which is positioned at the bottom of the oil reservoir chamber 52 in order to remove all of the oil from the oil reservoir chamber.

A low level sensor 100 can be provided adjacent to the bottom of the oil reservoir chamber 52 to detect low levels of oil and to send an appropriate signal either to a warning device or to cause a shut down of the compressors 12 in order to prevent damage occurring to the compressors due to a lack of oil.

An oil cooler coil 102 may be provided in the oil reservoir chamber 52 which may be in the form of a tube extending through the end cap 48 to allow a coolant to circulate within the oil to cool the oil prior to its being returned to the compressor 12, Also, one or more sight glasses 104 may be provided through the outer housing wall 47 in the area of the oil reservoir chamber 52 to allow a visual inspection of the level of oil within the oil reservoir chamber and a sight glass 106 may also be provided through the outer housing wall 47 in the area of the oil separator chamber 50 to allow for a visual inspection of the level of oil present in the bottom of the oil separator chamber.

Although the oil transfer tube 88 provides an effective means for allowing a flow of oil from the oil separator chamber to the oil reservoir chamber, but preventing a flow of oil from the oil reservoir chamber to the oil separator chamber, this function can also be provided by a number of other arrangements. For example, FIG. 3 shows an oil separator 26A which is virtually identical to that shown in FIG. 2, except for some of the optional features such as the drain 98, the low level sensor 100 and the cooling coil 102. Also, this oil separator 26A does not utilize an oil transfer tube, but rather utilizes a one way valve 110 which again will allow a flow of oil from the oil separator chamber to the oil reservoir chamber, but will prevent a flow of oil from the oil reservoir chamber to the oil separator chamber.

Further, although perhaps not providing as compact an overall unit as shown, other arrangements could be provided wherein the bottom wall of the oil separator chamber is elevated relative to the bottom wall of the oil reservoir chamber such that oil will flow from the oil separator chamber to the oil reservoir chamber and, so long as the level of oil within the oil reservoir chamber does not rise to the level of the bottom of the oil separator chamber, a reverse flow of oil will be prevented.

Various types of oil separating devices other than the helical separator shown in the drawings are contemplated by the present invention. It is sufficient to provide some means for separating the refrigerant gas from the oil so that the gaseous refrigerant can be directed back to the condenser 28 while the oil is transferred back directly to the compressor 12.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An oil separator for separating liquid oil from a gaseous refrigerant in a refrigerant system comprising:
    an oil separator chamber and an oil reservoir chamber arranged horizontally adjacent to one another;
        said oil separator chamber containing an oil separator having an inlet for receiving a refrigerant/oil mixture, a separating device for separating said gas and oil from said oil/gas mixture, a gas outlet, and an oil outlet leading from near a bottom of said oil separator chamber into said oil reservoir chamber;
        said oil reservoir chamber containing an oil return inlet opening near a bottom of said oil reservoir chamber leading to an outside of said oil reservoir chamber; and
    a device associated with said oil outlet for allowing a flow of oil from said oil separator chamber to said oil reservoir chamber, but preventing a flow of oil from said oil reservoir chamber to said oil separator chamber.

2. An oil separator according to claim 1, wherein said oil separator chamber and said oil reservoir chamber are connected together as a single integral unit.

3. An oil separator according to claim 1, wherein said separating device comprises a helical flow path extending from said inlet for centrifugally separating said oil from said gas.

4. An oil separator according to claim 3, wherein said helical flow path extends around a horizontal axis and said gas outlet is in the form of a tube extending along said horizontal axis through said baffle plate and through said oil reservoir chamber.

5. An oil separator according to claim 4, wherein said gas outlet tube has a vent opening in a portion of said tube positioned within said oil reservoir chamber to permit gases to exit said oil reservoir chamber into said gas outlet tube.

6. An oil separator according to claim 1, wherein said oil reservoir chamber includes at least one sight glass extending through a wall thereof to permit a viewing of an oil level therein.

7. An oil separator according to claim 1, wherein said oil reservoir chamber includes an oil cooling apparatus.

8. An oil separator according to claim 1, wherein said oil reservoir chamber includes a device for detecting a low level of oil in said oil reservoir chamber.

9. An oil separator according to claim 1, wherein said oil reservoir chamber includes an oil drain at a low level thereof.

10. An oil separator according to claim 1, wherein said oil reservoir chamber includes a gas vent to permit removal of gas refrigerant therefrom.

11. An oil separator according to claim 1, wherein said means for allowing a flow of oil comprises said oil outlet having the form of a tube extending through said baffle plate and into said oil reservoir chamber, said oil outlet tube terminating in an open end at an elevated position within said oil reservoir chamber.

12. An oil separator according to claim 1, wherein said oil outlet tube has said oil separator chamber outlet at a low elevation therein, extends upwardly, and terminates within said oil reservoir chamber at a high elevation therein.

13. An oil separator according to claim 1, wherein said means for allowing a flow of oil comprises a one way valve in said oil outlet between said oil separator chamber and said oil reservoir chamber.

14. An oil separator according to claim 1, wherein said oil separator includes means for maintaining a pressure differential between said oil separator chamber and said oil reservoir chamber during operation of said oil separator, with said oil separator chamber operating at a higher pressure than said oil reservoir chamber.

15. An oil separator for separating a gaseous refrigerant from a liquid oil in a refrigeration circuit, comprising:
    an integral single housing having formed therein an oil separator chamber and an oil reservoir chamber, arranged in a horizontal side-by-side relationship, separated by a vertical baffle plate;
    an inlet for a refrigerant/oil mixture leading into said oil separator chamber;
    means for separating said refrigerant from said oil positioned within said oil separator chamber in communication with said inlet;
    a refrigerant outlet leading from said oil separator chamber;
    an oil outlet leading from said oil separator chamber into said oil reservoir chamber; and
    a mechanism associated with said oil outlet for allowing a flow of oil from said oil separator chamber to said oil reservoir chamber, but preventing a flow of oil from said oil reservoir chamber to said oil separator chamber.

16. An oil separator according to claim 15, wherein said mechanism comprises said oil outlet having the form of a tube extending through said baffle plate and into said oil reservoir chamber, said oil outlet tube terminating in an open end at an elevated position within said oil reservoir chamber.

17. An oil separator according to claim 15, wherein said means for allowing a flow of oil comprises a one way valve in said oil outlet between said oil separator chamber and said oil reservoir chamber.

18. An oil separator for separating a gaseous refrigerant from a liquid oil in a refrigeration circuit, comprising:

an integral single housing having an external cylindrical wall defining therein an oil separator chamber and an oil reservoir chamber, arranged in a horizontal side-by-side relationship, separated by a vertical baffle plate;

an inlet for a refrigerant/oil mixture leading into said oil separator chamber through said cylindrical wall;

a horizontally disposed centrifugal separator having a helical vane extending around a horizontal axis against which said refrigerant/oil mixture is directed by said inlet;

a refrigerant outlet leading from said oil separator chamber comprising a tube extending along said horizontal axis within said helical vane and extending through said baffle plate and through said oil reservoir chamber;

an oil outlet leading from a low point in said oil separator chamber into said oil reservoir chamber; and a mechanism associated with said oil outlet for allowing a flow of oil from said oil separator chamber to said oil reservoir chamber, but preventing a flow of oil from said oil reservoir chamber to said oil separator chamber.

19. An oil separator according to claim 18, wherein said mechanism comprises said oil outlet having the form of a tube extending through said baffle plate and into said oil reservoir chamber, said oil outlet tube terminating in an open end at an elevated position within said oil reservoir chamber.

20. An oil separator according to claim 18, wherein said means for allowing a flow of oil comprises a one way valve in said oil outlet between said oil separator chamber and said oil reservoir chamber.

\* \* \* \* \*

UNITED STATES PATENT AND TRADEMARK OFFICE
CERTIFICATE OF CORRECTION

PATENT NO.  : 5,553,460
DATED       : September 10, 1996
INVENTOR(S) : Paul E. Isaacs It is certified that error appears in the above-indentified patent and that said Letters Patent is hereby corrected as shown below:

Column 6,

In claim 12, line 33, "claim 1" should be "claim 11"

Column 1, line 64, change "wall," to "wall."

Column 2, line 22, change "gases" to "gasses".

Signed and Sealed this

Seventeenth Day of June, 1997

Attest:

BRUCE LEHMAN

Attesting Officer

Commissioner of Patents and Trademarks